United States Patent
Poozhiyil et al.

(10) Patent No.: US 7,788,578 B1
(45) Date of Patent: Aug. 31, 2010

(54) SYSTEM AND METHOD FOR A TOOL PANE WITHIN A MARKUP LANGUAGE DOCUMENT

(75) Inventors: Suraj T. Poozhiyil, Seattle, WA (US); Pavel R. Karimov, Redmond, WA (US); Clinton D. Covington, Kirkland, WA (US); Lieh T. Han, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/884,064

(22) Filed: Jul. 1, 2004

Related U.S. Application Data

(60) Provisional application No. 60/545,412, filed on Feb. 18, 2004.

(51) Int. Cl.
  *G06F 17/00* (2006.01)
(52) U.S. Cl. ............... 715/243; 715/246; 715/248; 715/250; 715/253
(58) Field of Classification Search ......... 715/531, 715/515, 243, 246, 248, 250, 253
  See application file for complete search history.

(56) References Cited

U.S. PATENT DOCUMENTS

| | | | |
|---|---|---|---|
| 6,745,367 B1 * | 6/2004 | Bates et al. | 715/500 |
| 6,832,263 B2 * | 12/2004 | Polizzi et al. | 709/246 |
| 7,203,898 B2 * | 4/2007 | Miyazato et al. | 715/249 |
| 2002/0078102 A1 | 6/2002 | Dutta | 707/526 |
| 2002/0129106 A1 * | 9/2002 | Gutfreund | 709/205 |
| 2004/0070609 A1 * | 4/2004 | Estrada | 345/751 |
| 2004/0123238 A1 * | 6/2004 | Hefetz et al. | 715/513 |
| 2005/0081161 A1 * | 4/2005 | MacInnes et al. | 715/765 |

FOREIGN PATENT DOCUMENTS

JP  2000-227914  8/2000

OTHER PUBLICATIONS

Screen Shot, Microsoft Office Professional Edition 2003, Copyright 1987-2003, Microsoft Corporation, p. 1.*
Rizzo, T., "Developing Web Parts for Microsoft SharePoint Products and Technologies Version 2.0: Advanced Topics," Retrieved from the Internet: http//web.archive.org/web/*/http://www.ftponline.com/portals/microsoft/webpart/articles/rizzol/>, Oct. 21, 2003, pp. 4-8.
Banerjee N., "Modifying the User Interface for Web Parts and Web Parts Pages," http://msdn.microsoft.com/library/default.asp?url=/library/en-us/dnspts/html/sharepoint_modifyingui.asp>, May 2003, 6 Pgs.

(Continued)

*Primary Examiner*—Stephen S Hong
*Assistant Examiner*—Matthew J Ludwig
(74) *Attorney, Agent, or Firm*—Merchant & Gould, P.C.

(57) ABSTRACT

A tool pane is included in a markup language document, such as a web page, that allows web page and web parts included in the web page to be modified. The tool pane allows a user to select among various modes for the tool pane including a gallery mode, a properties mode, and a customization mode. During the gallery mode the user may select from additional web parts to add to the page or remove web parts. The properties mode allows the user to adjust the properties of the web parts included in the page. The customization mode allows for customizing the tool pane itself to allow additional functions or restrict selected functions. A tool pane may be partially customized or fully customizes as selected by a user.

25 Claims, 7 Drawing Sheets

OTHER PUBLICATIONS

Baron, A., "A Developer's Introduction to Web Parts," Retrieved from the Internet: http:/msdn.microsoft.com/library/default.asp?url=/library/en-us/dnspts/html/sharepoint_northwindwebparts.asp>, May 2003, 20 Pgs.

Yamaichi, R.; "*SharePoint Portal Server 2003 Anatomy Illustration*"; *Windows Server World*, vol. 8, No. 9, pp. 211-218, IDG Japan, Inc., Japan, Sep. 1, 2003.

Notice of Rejection dated Mar. 2, 2010, issued in Japanese Patent Application No. JP 2005-041855, 4 pgs.

* cited by examiner

SYSTEM AND METHOD FOR A TOOL PANE WITHIN A MARKUP LANGUAGE DOCUMENT

CROSS REFERENCE(S) TO RELATED APPLICATION(S)

This application is a utility patent application that claims the benefit under 35 United States Code §119(e) of U.S. Provisional Patent Application No. 60/545,412 filed on Feb. 18, 2004. This application is also related to the co-pending U.S. patent application Ser. No. 10/463,318 entitled "Method and System for Manipulating Page Control Content," filed on Jun. 16, 2003; No. 10/463,779 entitled "Method and System for Customizing and Personalizing Page Control Content," filed on Jun. 16, 2003; and Ser. No. 10/463,835 entitled "Method and System for Providing Page Control Content" filed on Jun. 30, 2003.

BACKGROUND OF THE INVENTION

Software programs used for access and management of information, such as web browser programs, word processing programs, file management programs, spreadsheet programs, database programs, etc., typically provide an interface medium for a user, such as a page, document, spreadsheet, record, etc. This interface medium facilitates the user to access and manage information. For example, a user may access a web page using a web browser to access and/or manage information that is presented or represented on the page.

In such a web environment, the web page may be a web part page that includes web parts. A web part page is a special type of web page that consolidates data such as lists and charts, and web content such as text and images, into a dynamic information portal built around a common task or special interest. Each web part page contains one or more web part zones, which in turn contain one or more web parts. Web parts are the basic building blocks of a web part page. A web part may be described as a modular unit of information that has a single purpose. Each instance of a specific web part may be similar or different in appearance and behavior, but it usually based on the same web part assembly file installed on the site server. There can also be code for more than one web part in a web part assembly file.

In a web environment that includes web part pages and web parts, a user may wish to view or modify properties of web parts or web part pages using a thin client (e.g., web browser) or rich client user interface. However, modification of such web parts and the web part page required a level of understanding of the markup and markup language (e.g., html, XML, etc.) used to generate the web parts page.

In view of the foregoing, a need exists for a utility that allows viewing and modification of the web parts page and web parts without requiring extensive technical knowledge on the part of the user.

SUMMARY OF THE INVENTION

The present invention provides a system and method for a tool pane included within a markup language document that allows modification of components within the markup document. In accordance with one aspect of the present invention, the markup language document includes web pages written in XML, HTML, or other markup languages. In accordance with another aspect of the present invention, the web page is a web parts page, wherein the modifiable components include web parts as previously described.

Unlike previous designs, the tool pane is instantiated as part of the web parts page. Accordingly, changes selected in the tool pane that effect the properties, layout, or appearance of the web parts page, are dynamically updated in the web parts page as these changes are selected. Furthermore, changes made to the web parts page that affect the tool pane, are also reflected dynamically in the tool pane.

The tool pane includes tool parts that provide different functions for modifying the web parts page. The tool parts displayed on the tool pane change depending on the current mode of the tool pane. In one aspect of the present invention the tool pane may be in a gallery mode, a properties mode, or a customized (or extensible) mode. In the gallery mode the user is provided with functions for adding and removing web parts, changing the layout of the web parts page, and performing other functions affecting the appearance of the web parts page. In the properties mode, the user is provided functions for changing the settings of the web parts, changing the layouts within selected web parts, changing the contents and style of the web parts, and otherwise performing functions regarding settings and properties of the web parts page. In the customized mode, the tool pane is providing one or more customized tool parts which may have been composed by the user. The customized tool parts provide for customized functions that effect the web parts page. As stated, changes selected in the tool pane while in any of these modes are dynamically updated in the web parts page.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
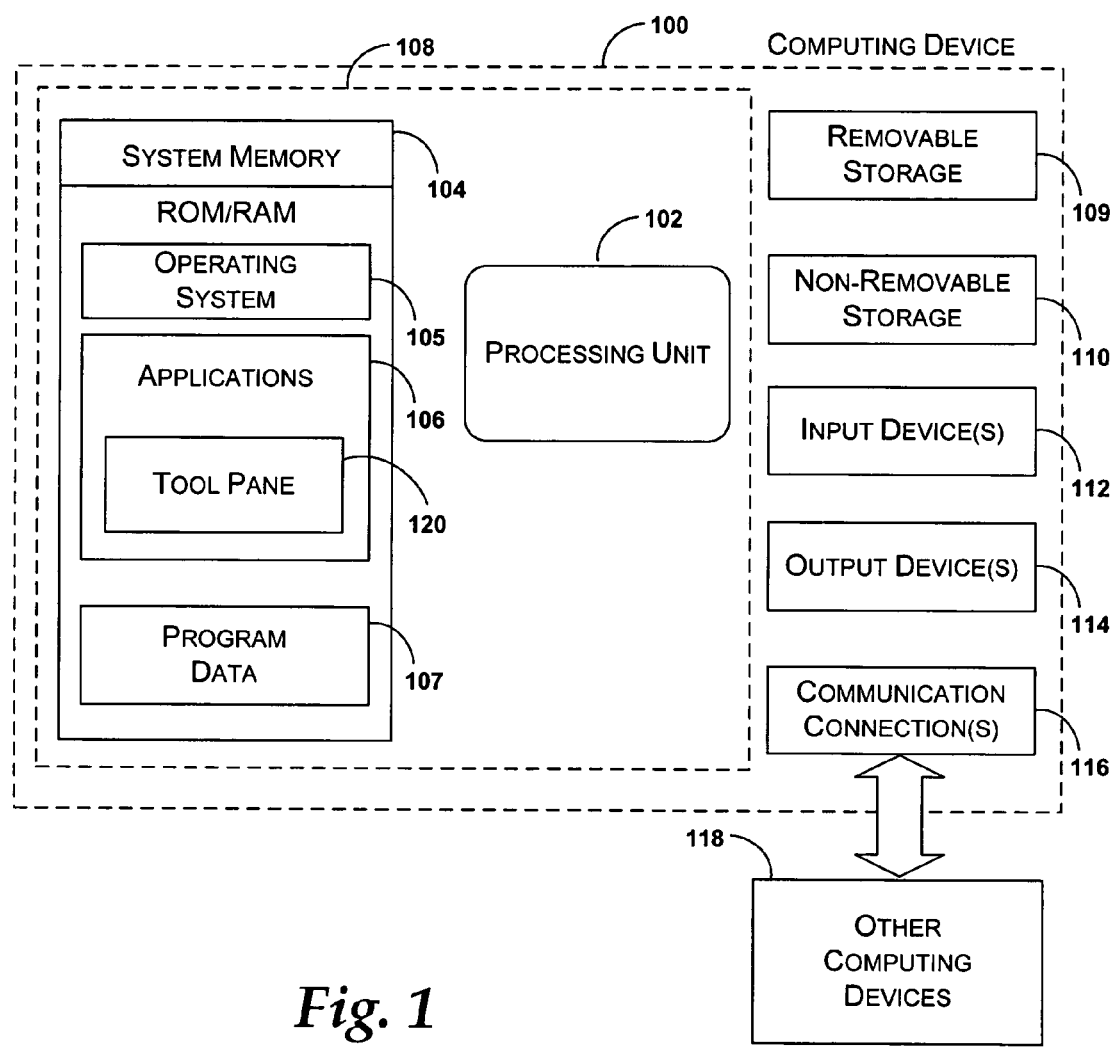
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device that provides client provisioning according to Open Mobile Alliance (OMA) guidelines. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a tool pane application 120 for implementing the functionality of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Tool Pane Embodiment

A tool pane in accordance with the presence invention is generally directed to providing functions for modifying components of a markup document (e.g., web parts of a web parts page) in which the tool pane is included. In one embodiment, the functions for adjusting the web parts are provided in the form of tool parts included within the tool pane. The tool parts may be used for setting properties, executing commands, following wizards, and otherwise manipulating web parts on the page. The tool parts may be changed as the tool pane moves between various available modes. The relation of the tool pane, tool parts, web parts page, and web parts is described in greater detail below with relation to FIG. 2. In further embodiments, the tool parts are customizable by a user or administrator so that additional functions not previously included within the tool pane may be added, additional tool parts may be selected, and existing tool parts may be restricted or adjusted.

Figure 2:
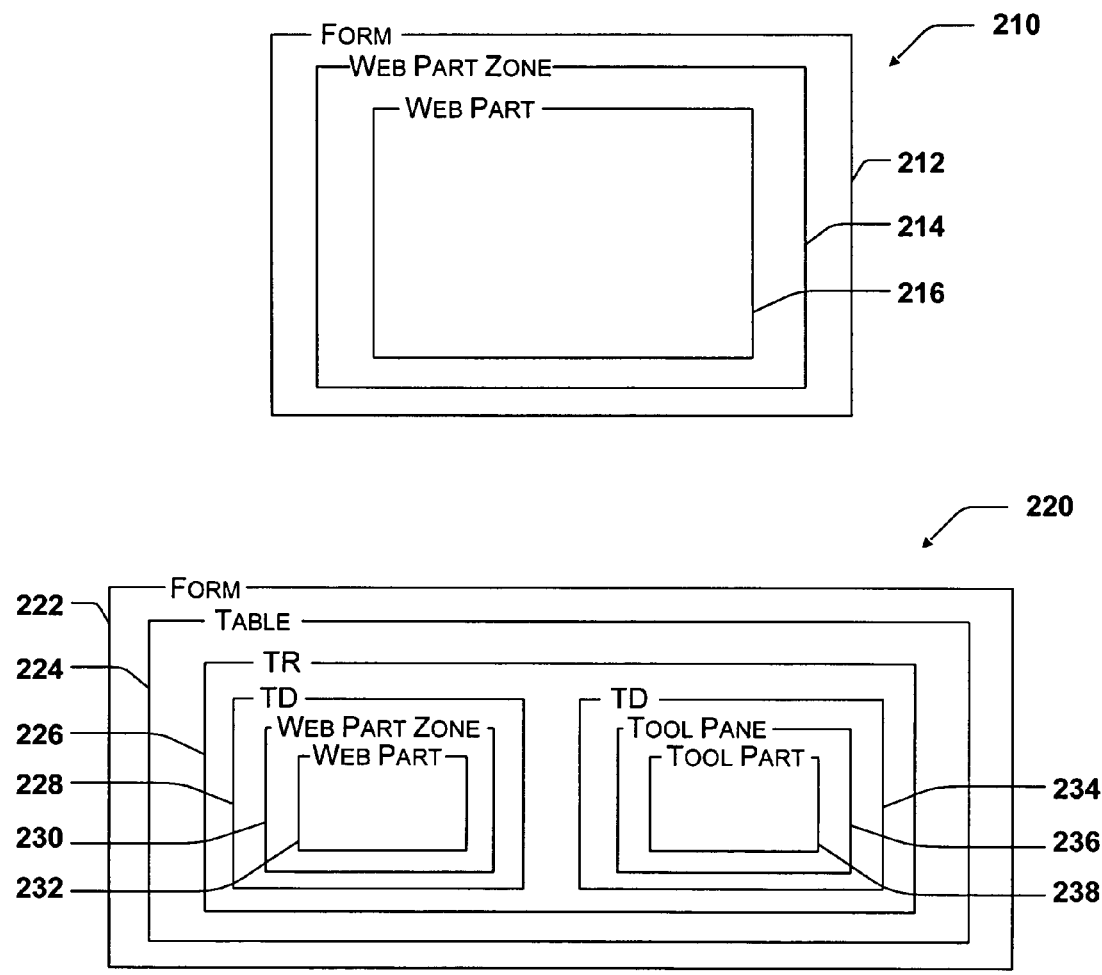
FIG. 2 illustrates an exemplary diagram for the context of the tool pane in relation to web parts and web part pages.

FIG. 2 illustrates an exemplary diagram for the context of the tool pane in relation to web parts and web part pages in accordance with the present invention. Two web pages are included: a first web page 210 for a form 212 that does not include a tool pane; and a second web page 220 that includes a tool pane.

As shown, the hierarchy for web page 210 includes form 212 which further includes additional components. The components may include one or more web part zones 214 and one or more web parts 222. Form 212 corresponds to a web part page creation form that provides selection among templates for the general layout of a web part page.

The hierarchy is changed for the web page 220 that includes the tool pane 236. The hierarchy for web page 210 also includes a form 222, but then inserts a table 224 that includes a row (TR) 226 with two cells (TD) 228, 234 such that the contents of form 222 are wrapped by table 224. The contents of form 222 are inserted into the left cell 228, as indicated by components including one or more web part zones 230 and one or more web parts 232. The contents of the tool pane are inserted into the right cell 234, as indicated by tool pane 236 and one or more tool parts 238. In further embodiments, more than one tool pane may be included in a web page despite the inclusion of a single tool pane in the current embodiment. Additional cells could be included for the inclusion of additional tool panes as selected by a user or developer. Furthermore, in one embodiment, table 224 is generated to wrap the contents of form 222 automatically by code associated with the tool pane that is resident on a server hosting web page 220. Additionally, table 224 may already exist for a web page 220 (e.g., the tool pane was previously instantiated within web page 220). When table 224 already exists, table 224 may be reused for instantiating the current tool pane rather than generating a new table.

Although tool pane 236 is shown as rendering on the left in the example of FIG. 2, an author of the web page may specify the location in which the tool pane should appear. Furthermore, functionality may be included to change the width or other appearance properties of the tool pane as desired by the web page author. In another embodiment, code is include on the server hosting web page 220 that allows an end-user to also adjust the width or other appearance properties of the tool pane rather than limiting the adjustment ability to the web page author.

Figure 3:
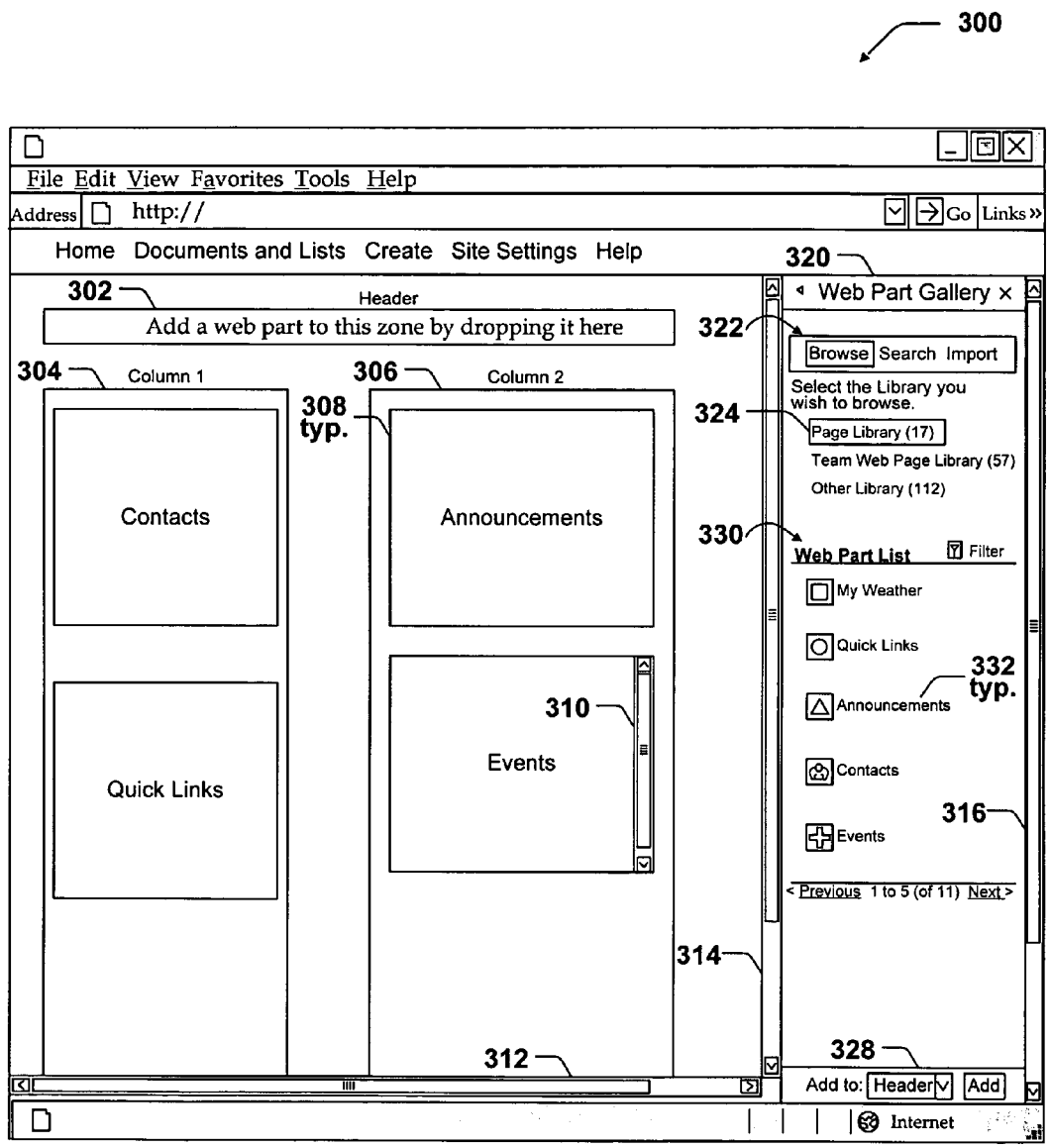
FIG. 3 illustrates an exemplary web page that includes a tool pane that is in a gallery mode.

FIG. 3 illustrates an exemplary web page that includes a tool pane that is in a gallery mode in accordance with the present invention. In the interests of clarity and comprehension, the components of the web page 300 that are common to web pages (e.g., pull down menu headings, etc.) have not been labeled with reference numbers. In relation to the present invention, web page 300 includes web part zones 302, 304, 306, and tool pane 320. Web part zones 302, 304, 306 may further include any number of web parts (e.g., 308). In this example, tool pane 320 further includes tool parts 322, 328, and 330 corresponding to the tool pane being in a gallery mode.

In the example shown, the web part zones 302, 304, 306 correspond to a header, a column 1, and a column 2 respectively. However, any number of web part zones may be included in web page 300 whether or not they are viewable on the screen, as indicated by scroll bars 312 and 314. Furthermore, web part zones 302, 304, 306 may be arranged in any format (e.g., columns, blocks, rows, etc.) and in any order on web page 300.

The web parts (e.g., 308) inserted into web part zones 302, 304, 306 may also be arranged in any order and in any format. Tool pane 320 provides the user interface for inserting the web parts into the web part zones. When tool pane 320 is in gallery mode, a user may be presented with a number of tool parts (e.g., 322) for modifying the web parts included in web page 300.

One exemplary tool part that may be included in a tool pane in gallery mode is a browse, search, and import tool part such as tool part 322 in tool pane 320. Tool part 322 allows a user to browse or search libraries (e.g., 324) for different web parts to include within web page 300 and then import those web parts into the page. The content of tool part 322 may change depending on whether the user has select to browse, search, or import a desired web part (e.g., 308).

Another exemplary tool part that may be included in a tool pane in gallery mode is a web part list tool part, such as tool part 330 in tool pane 320. Tool part 330 lists the web parts (e.g., 308) that are included in the web part zones (e.g., 302) in web page 300. Each listing (e.g., 332) may include an icon or other identifier associated with the web part listed.

Still another exemplary tool part that may be included in a tool pane in gallery mode is an add tool part, such as tool part 328 in tool pane 320. Tool part 328 allows a user to add a web part selected from a library using tool part 320 to a selected web part zone (e.g., 302). Tool part 328 may also be used to move a web part included in another web part zone (e.g., 304) to the selected web part zone (e.g., 302).

In one embodiment, the tool parts shown in the tool pane 320, is dependent on the tool parts selected by the developer of a particular web part. For example, the developer may select a default set of tool parts by not selecting any particular tool parts to be associated with the web part.

The gallery mode shown in FIG. 3 is described in more detail in the related application, application Ser. No. 10/463,825, entitled, "Method and System for Providing Page Control Content" filed on Jun. 30, 2003, and is incorporated herein in its entirety.

Figure 4:
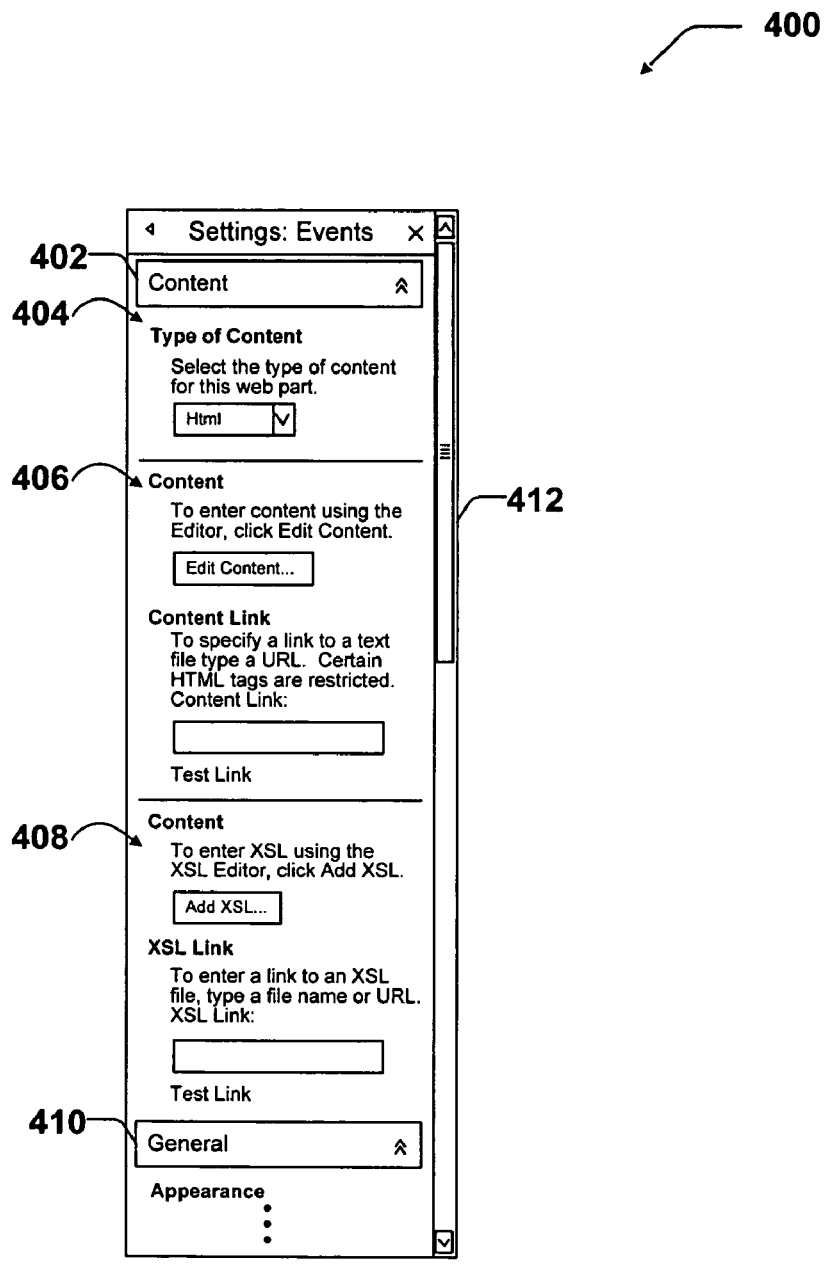
FIG. 4 illustrates an exemplary tool pane that is in a properties mode.

FIG. 4 illustrates an exemplary tool pane that is in a properties mode in accordance with the present invention. Tool pane 400 includes tool parts 402 and 410 which are exemplary of properties that may be adjusted using tool pane 400 when in the properties mode.

Tool part 402 is directed to the content of a particular web part (e.g., events) and further includes sections 404, 406, and 408 for providing particular functionality related to the content of the selected web part. For example, in section 404, the user is provided a selection of the type of content for the web part. The type of content can include html content, word processor content, or other types of content.

In another embodiment, sections 404, 406, and 408 are separated into separate tool parts, rather than being included in a single tool part 402. With the tool parts separated, each of these property adjustments may be removed or modified if tool pane 400 is customized. Customization of a tool pane is discussed in greater detail below with respect to FIGS. 5-7.

As indicated by scroll bar 412, tool pane 400 is not limited to the tool parts shown and described. Other tool parts may further included that modify other aspects of the web parts. Furthermore, adjusting the properties of the web parts may be separated into more than one tool pane. For example, the properties mode may include tool panes for adjusting the settings of a selected web part, whereas another tool pane is dedicated to adjusting the layout of the selected web part.

The gallery mode shown in FIG. 4 is described in more detail in the related application, application Ser. No. 10/463,318, entitled, "Method and System for Manipulating Page Control Content" filed on Jun. 16, 2003, and is incorporated herein in its entirety.

Figure 5:
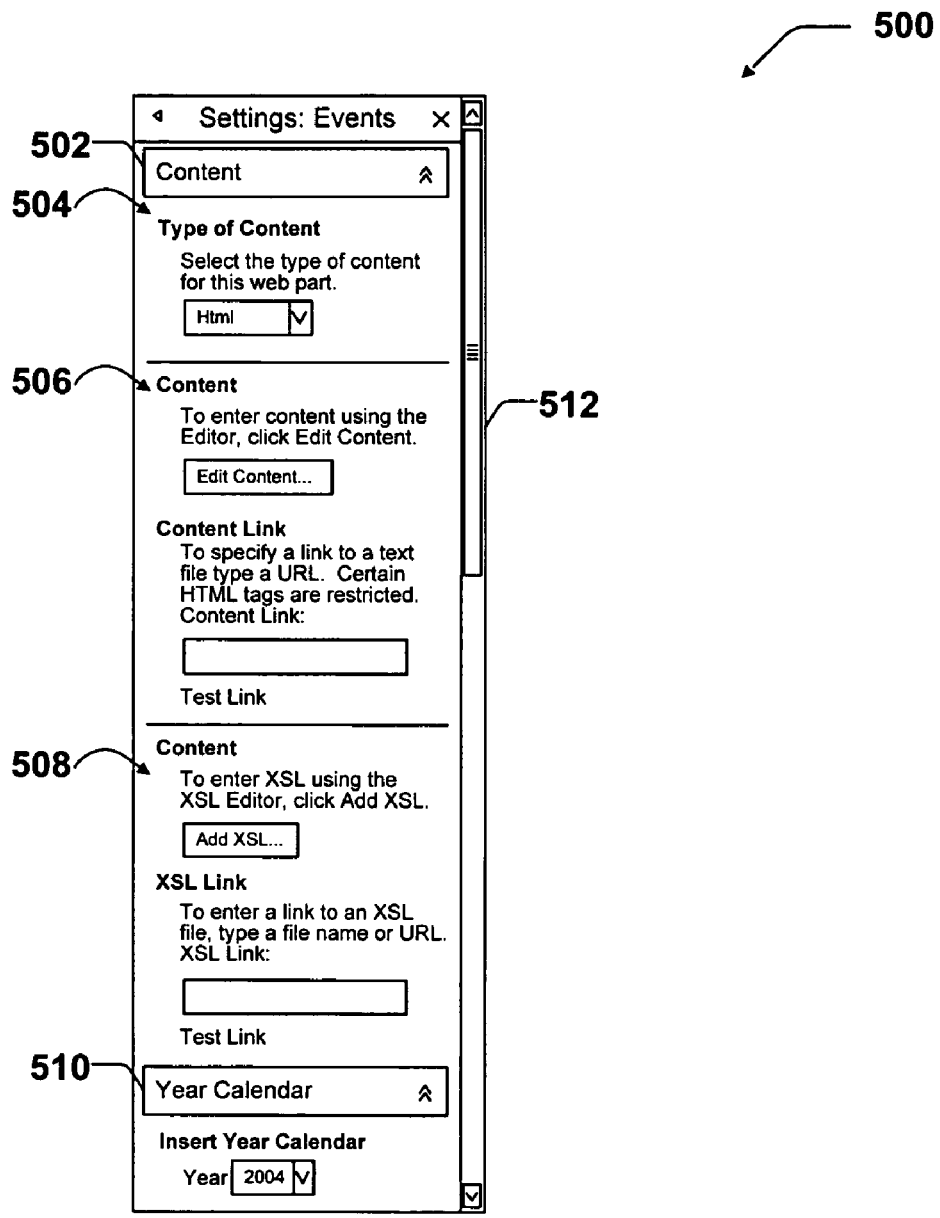
FIG. 5 illustrates an exemplary partially-customized tool pane.

FIG. 5 illustrates an exemplary partially-customized tool pane in accordance with the present invention. Tool pane 500 is similar to tool pane 400 shown in FIG. 4 and includes tool part 502 that is similar to tool part 402 shown in FIG. 4. However, tool pane 500 also includes customized tool part 510 for inserting a year calendar within the associated events web part, and even allows a user to select which year.

Customized tool part 510 is generated in tool pane 500 in response to the developer of the events web part authoring customized tool part 510 and storing it on the server. Accordingly, when the tool pane associated with the events web part is instantiated, the association with customized tool part 510 made by the developer is discovered and customized tool part 510 is inserted into tool pane 500.

It is appreciated that customized tool part 510 may be written in various types of code (e.g., XML, HTML, etc.) by the developer for inclusion in tool pane 500.

As indicated by scroll bar 512, tool pane 500 is not limited to the tool parts shown and described. Other tool parts may further included that modify other aspects of the web parts.

Figure 6:
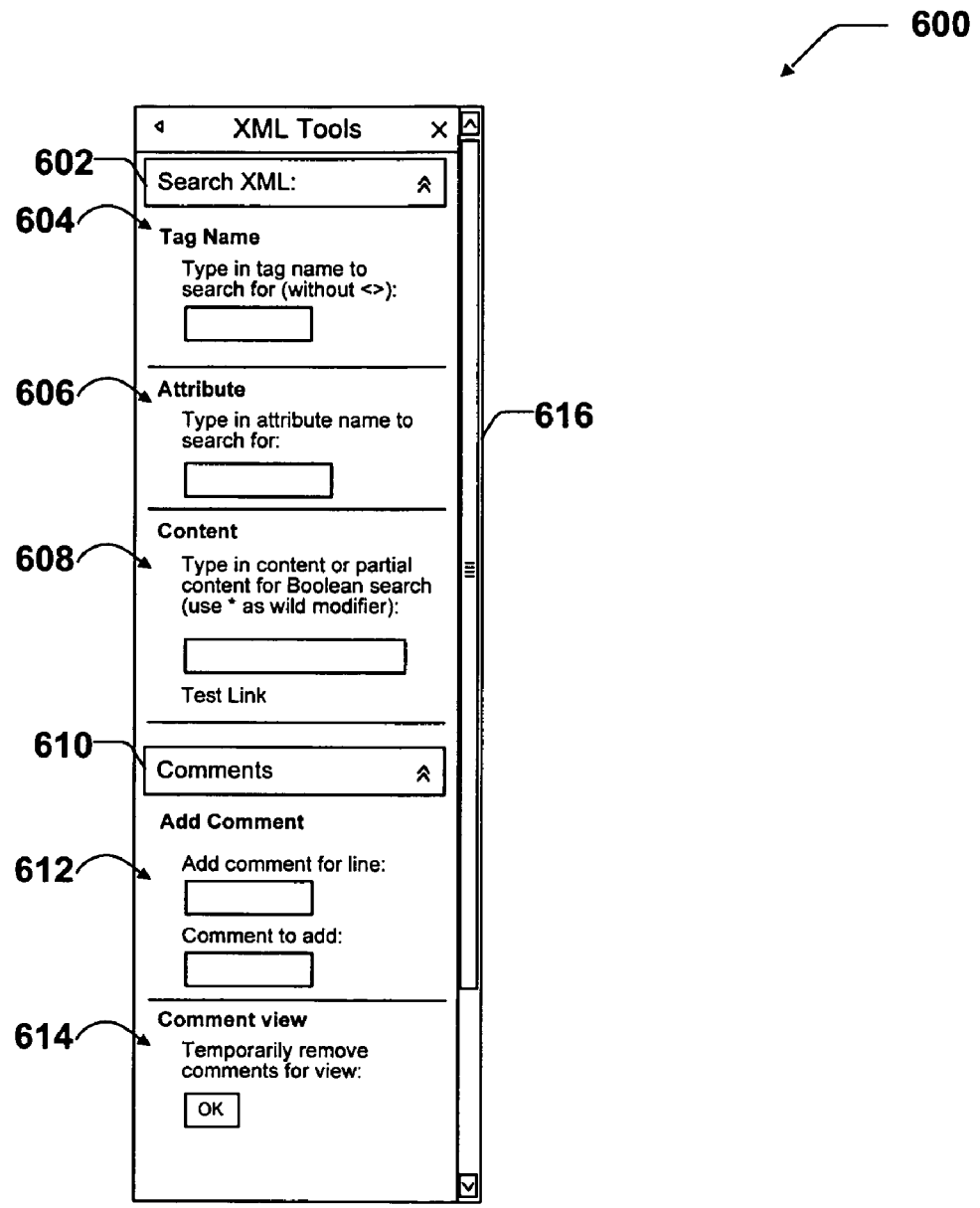
FIG. 6 illustrates an exemplary customized tool pane.

FIG. 6 illustrates an exemplary customized tool pane in accordance with the present invention. Customized tool pane 600 includes customized tool parts 602 and 610 without including any standard or default tool parts.

In this example, customized tool pane is directed to XML tools for a web part containing XML. Customized tool part 602 is directed searching the XML and further includes sections 604, 606, and 608 for providing particular functionality related to the search. For example, in section 604, the user is provided a field for entering a tag name for searching. Possibly, the web part would adjust its field of view to encompass a first tag found according to the search, thereby dynamically updating the web part according to a selection entered in customized tool pane 600.

Also provided in the example is customized tool part 610, that allows the changes (e.g., adding comments 612, and removing comments from view 614) in the comments associated with the XML. In one embodiment, tool part 610 is associated with the same web part as tool pane 602. In another embodiment, tool part 610 is associated with a different web part than the web part associated with tool part 602.

Customized tool pane 600 is generated in response to the developer of the events web part authoring customized tool parts 602 and 610 and storing them on the server. The developer then selected to have only these tool parts associated with web part authored. Accordingly, when the tool pane is instantiated for the authored web part, it is customized tool parts 602 and 610 that are instantiated in customized tool pane 600.

It is appreciated that the customized tool parts may be written in various types of code (e.g., XML, HTML, etc.) and parsed for inclusion in customized tool pane 600.

As indicated by scroll bar 616, customized tool pane 600 is not limited to the tool parts shown and described. Other tool parts may further included that modify other aspects of the web parts.

In additional embodiments, customized tool pane 600 is further customizable by the associated web part author with respect to the function and appearance aspects of customized tool pane 600 itself. For example, the associated web part author may change the title of the tool pane so that it appears at the bottom of customized tool pane 600. The author may also select to eliminate the close button or expansion button on customized tool pane 600 according to their preference. Customized tool pane 600 is provided so that an author may customize not only the content of customized tool pane 600, but the overall appearance and user experience as well.

Customization is described in more detail in the related application, application Ser. No. 10/463,779 entitled "Method and System for Customizing and Personalizing Page Control Content," filed on Jun. 16, 2003, and is incorporated herein in its entirety.

Figure 7:
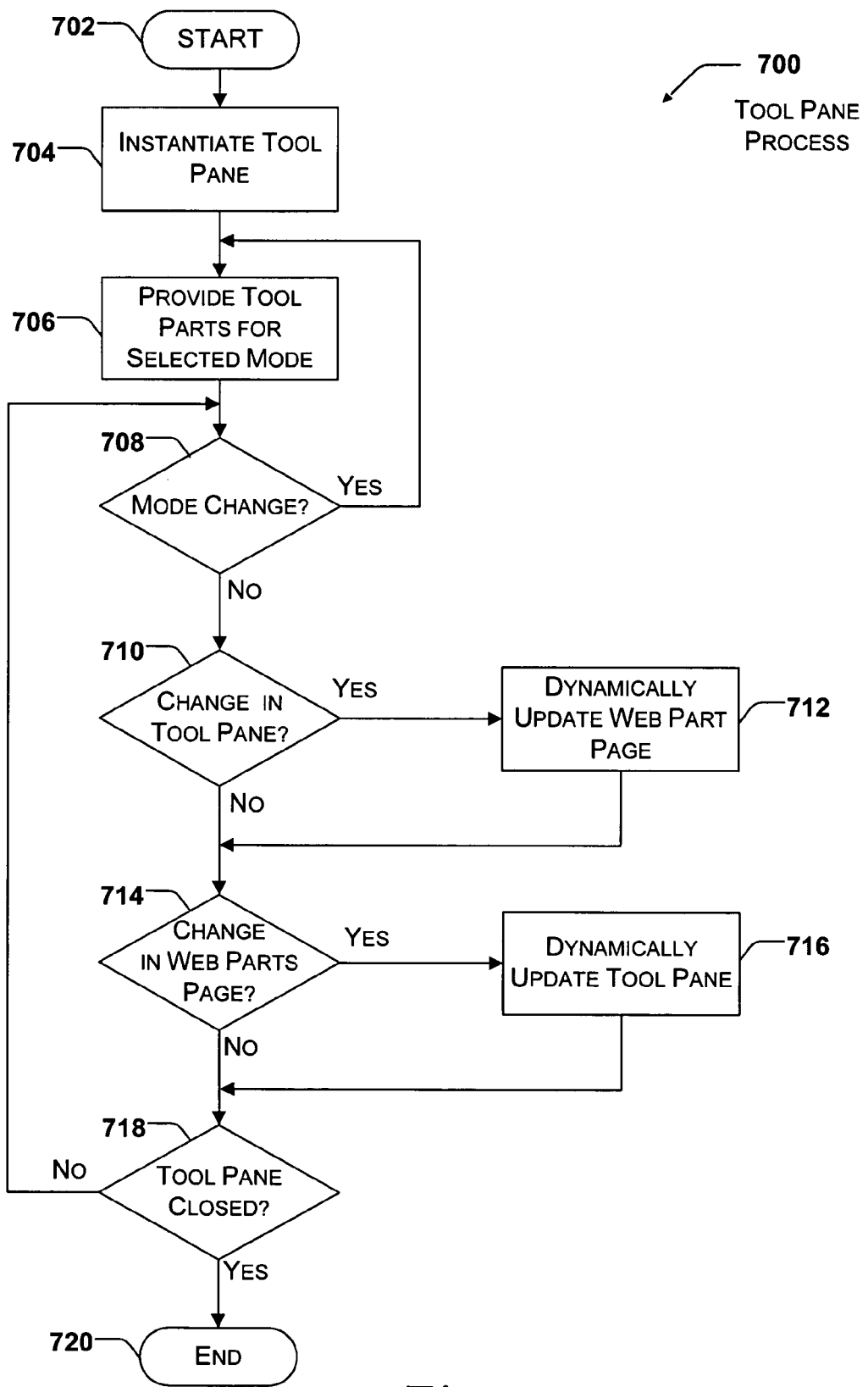
FIG. 7 illustrates a logical flow diagram of a process for instantiating and using a tool pane, in accordance with the present invention.

FIG. 7 illustrates a logical flow diagram of a process for instantiating and using a tool pane, in accordance with the present invention. Process 700 starts at block 702 where the code for the tool pane is included within the code for modifying and displaying a web parts page. Processing continues at block 704.

At block 704, the tool pane is instantiated into the web parts page. In one embodiment, the tool pane is included directly into the code of the web parts page, rather than being included as a separate coded page as in previous designs (see FIG. 2). As previously stated, the position and size of the tool pane may be adjusted or changed as selected by a user. In one embodiment, to instantiate the tool pane, a field value is set that is sent to a server that is hosting the web parts page. The field value notifies the server that a tool pane is to be instantiated in the web parts page. The field value also notifies the server of the mode for the particular tool pane, and depending on the mode (e.g., if in properties mode), provides a unique ID of web part on the web parts page to further identify the tool pane to instantiate. The server then asks for the tool parts to display with this tool pane and includes these tool parts within the instantiated tool pane. In another embodiment, one or more web parts within the web parts page are evaluated for their set properties and values, and the properties and values are displayed in the instantiated tool pane according to their current settings. For example, a web part may have an associated height property. If so, the height property is included in the tool pane when instantiated. When the tool pane is instantiated, processing continues at block 706.

At block 706, the tool parts for a mode selected by the user are provided in the tool pane. For example, the user may have selected to change a property associated with selected web part. The tool pane then provides the tool parts associated with the properties mode that allow the user to change the property selected. Alternatively, the user may have selected to add a web part to a web part zone of the web parts page. If the user has selected to add a web part, then the tool parts for the gallery mode are inserted into the tool pane. Once the tool parts for the selected mode are provided, processing continues at decision block 708.

At decision block 708, a determination is made whether the user has decided to change modes while the tool pane is instantiated. For example, the tool pane may be in the properties mode and the user selects to change to the gallery mode or the customized mode. When the user selects to change the mode, processing returns to block 706, where the tool parts for the newly selected mode are provided. Alternatively, if the user has not selected a change in the mode at this time, processing proceeds to decision block 710.

At decision block 710, a change may be selected in the tool pane by the user. For example, a property may be changed by the user in the tool pane while the tool pane is in the properties mode. In another example, the user may have selected to add a web part to a web part zone by making the selection in the tool pane. In one embodiment, when a change is made in the tool pane to a property of a web part, the list of web part properties, including the change, is resubmitted to the server hosting the web parts page. Code resident on the server then determines what has changed. When a change hasn't been made, processing advances to decision block 714. However, when one or more changes occur within the tool pane that affects the web parts page, processing moves to block 712.

At block 712, the web parts page is dynamically updated to reflect the change selected by the user in the tool pane. For example, if a user selects within the tool pane to add a web part to a web part zone, the web part appears in the web part zone with further interaction required by the user. The user does not have to refresh the screen, change between pages, or effect other process changes, as the change is reflected dynamically in the web parts page. In one embodiment, the user selects an "Apply" button or "OK" button to confirm the selected modification. Since the functions provided by the tool parts dynamically affect the web parts page, the user is allowed to view the changes as they are being made. In one embodiment, the change is made by the server hosting the web parts page in response to a list of properties received that included the change. Once the change effected by the user in the tool pane is dynamically reflected in the web parts page, processing continues decision block 714.

At decision block 714, a determination is made whether a change is effected in the web parts page that should be reflected in the tool pane. For example, a user may have dragged and dropped a new web part into a web part zone within the web parts page, and a certain tool parts within the tool pane should reflect this change. When a change hasn't been made, processing advances to decision block 718. However, when one or more changes occur within the web parts page that affects the tool pane, processing moves to block 716.

At block 716, the tool pane is dynamically updated to reflect the change made in the web parts page. For example, in one or more of the modes of the tool pane, the tool pane may include a tool part that corresponds to a web part list (e.g., tool part 330 in FIG. 3). When a new web part is dragged and dropped into the web parts page, the list of web parts included in the tool pane is dynamically updated. Once the tool pane is dynamically updated due to a change in the web parts page, processing continues at decision block 718.

At decision block 718, a determination is made whether the tool pane has been closed. The tool pane may be close through action of the user, by closing the tool pane, or closing the web parts page itself. Alternatively, the web parts page may crash, or other processing errors may cause the tool pane to close. If the tool pane is not closed by the user or by other process actions, processing returns to decision block 708 where process 700 continues. Otherwise, if the tool pane is closed, processing continues to block 720, where process 700 ends.

Other process interactions may occur with relation to the web parts page and the tool pane before, after, and throughout process 700 without departing from the spirit or scope of the invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for modifying appearance and behavior of a markup document having components, comprising:
    instantiating a web parts page; wherein the web parts page includes web part zones that include one or more web parts;
    instantiating a tool pane including tool parts for modifying the web parts page by adding code directly within code of the instantiated web parts page such that the instantiation of the tool pane changes a hierarchy of the web parts page;
    selecting tool parts that provide different functions to include within the tool pane for modifying the web parts page; wherein at least one of the different functions effect the layout of the web parts page; wherein at least another one of the different functions effect the appearance of the web parts page; wherein at least another one of the different functions changes a setting of a web part within the web parts page; and wherein at least another one of the different functions changes a number of web parts included in the web parts page;
    displaying the tool pane with the selected tool parts as part of the web parts page such that the tool pane is displayed within the web parts page that is modified using one of the provided tool parts;
    receiving an input to perform one of the functions that is associated with one of the tool parts that is included within the tool pane; wherein performing the function modifies the web parts page; and
    dynamically modifying the display of the web parts page and the tool pane in response to the modification of the web parts page such that different tool parts are included within the tool pane within the web parts page; wherein the same web parts page remains displayed.

2. The computer-implemented method of claim 1, further comprising:
    dynamically modifying the web parts page according to the adjustments made to the functions.

3. The computer-implemented method of claim 1, wherein instantiating the tool pane further comprises receiving a field value directing the tool pane to be initiated.

4. The computer-implemented method of claim 3, wherein the field value further includes a unique identifier for a selected web part within the web parts page, such that the tool pane instantiated is associated with the selected web part.

5. The computer-implemented method of claim 3, wherein the field value includes a mode for the tool pane, such that the tool pane is instantiated with functions that correspond to the mode.

6. The computer-implemented method of claim 1, further comprising wrapping the tool pane in a first cell of a table and the web parts in a second cell of the table.

7. The computer-implemented method of claim 1, wherein the functions correspond to tool parts included in the tool pane.

8. The computer-implemented method of claim 7, wherein the at least one of the functions corresponds to a customized tool part.

9. The computer-implemented method of claim 1, wherein at least one of the web parts is evaluated for associated properties and the properties are displayed in the instantiated tool pane.

10. A system for modifying appearance and behavior of a web parts page including web parts, comprising:
    a computing device; and
    an application included on the computing device, wherein the application is configured to:
    instantiate a tool pane as part of the web parts page by adding code within code of an already instantiated web parts page; wherein the tool pane includes selected functions to modify the web parts page; wherein the web parts page includes web zones that include one or more web parts; wherein the functions are selected from functions that effect a layout of the web parts page; functions that change a setting for a web part within the web parts page; functions that change a number of web parts included in the web parts page; and functions that effect an appearance of the web parts page;
    receive an input indicating to perform one of the functions included within the tool pane;
    dynamically modify the web parts page according to performing the function; wherein the same web parts page remains displayed;
    modifying the tool pane in response to the modification of the web parts page such that different functions are included within the tool pane within the web parts page; and
    closing the tool pane.

11. The system of claim 10, wherein the functions include standard functions and customized functions; and
    communicate the markup documents, the components, and the tool pane to a display.

12. The system claim 10, wherein the application is further configured to receive a field value directing the tool pane to be initiated.

13. The system claim 12, wherein the field value further includes a unique identifier for a web part within the web parts page, such that the tool pane instantiated is associated with the web part.

14. The system of claim 12, wherein the field value includes a mode for the tool pane, such that the tool pane is instantiated with functions that correspond to the mode.

15. The system of claim 10, wherein the tool pane is wrapped in a first cell of a table and the web parts are wrapped in a second cell of a table.

16. The system of claim 10, wherein the functions correspond to tool parts included in the tool pane.

17. The system of claim 10, wherein the application is further configured to evaluate for associated properties and the properties are displayed in the instantiated tool pane.

18. A computer-readable storage medium including instructions for modifying appearance and behavior of a markup document having components, the instructions comprising:
    instantiating a tool pane within code of the markup document after the markup document has been instantiated; wherein the markup document includes components;
    providing functions for modifying the markup document and components, wherein the functions are selectively provided within the tool pane according to selected customizations; wherein the functions are selected from functions that effect a layout of the component within the markup document; functions that change a setting for a component within the markup document; functions that change a number of components included in the markup document; and functions that effect an appearance of the markup document;
    communicating the markup documents, the components, and the tool pane to a display;

receiving data indicating adjustment of the functions within the tool pane; wherein the adjustment of the function modifies the markup document when the function is performed; and dynamically modifying the markup document and components according to the adjustments made to the functions; and modifying an appearance of the tool pane and the markup document in response to the modification of the markup document and the components.

19. The computer-readable medium of claim 18, further comprising:

receiving an input indicating adjustment of functions included within a tool pane, wherein the tool pane is included within the markup language document and dynamically modifying the markup document and components according to the adjustments made to the functions.

20. The computer-readable medium of claim 18, wherein instantiating the tool pane further comprises receiving a field value directing the tool pane to be initiated.

21. The computer-readable medium of claim 20, wherein the field value further includes a unique identifier for a selected component within the markup document, such that the tool pane instantiated is associated with the selected component.

22. The computer-readable medium of claim 20, wherein the field value includes a mode for the tool pane, such that the tool pane is instantiated with functions that correspond to the mode.

23. The computer-readable medium of claim 18, wherein the markup document is a web parts page and the components are one of web parts and web part zones.

24. The computer-readable medium of claim 18, wherein the functions correspond to tool parts included in the tool pane.

25. The computer-readable medium of claim 18, wherein at least one of the components is evaluated for associated properties and the properties are displayed in the instantiated tool pane.

* * * * *